April 26, 1966 F. H. TENNIS 3,247,768
INTERLOCK FOR HYDRAULIC CONTROL VALVES AND THE LIKE
Filed June 16, 1965 7 Sheets-Sheet 1
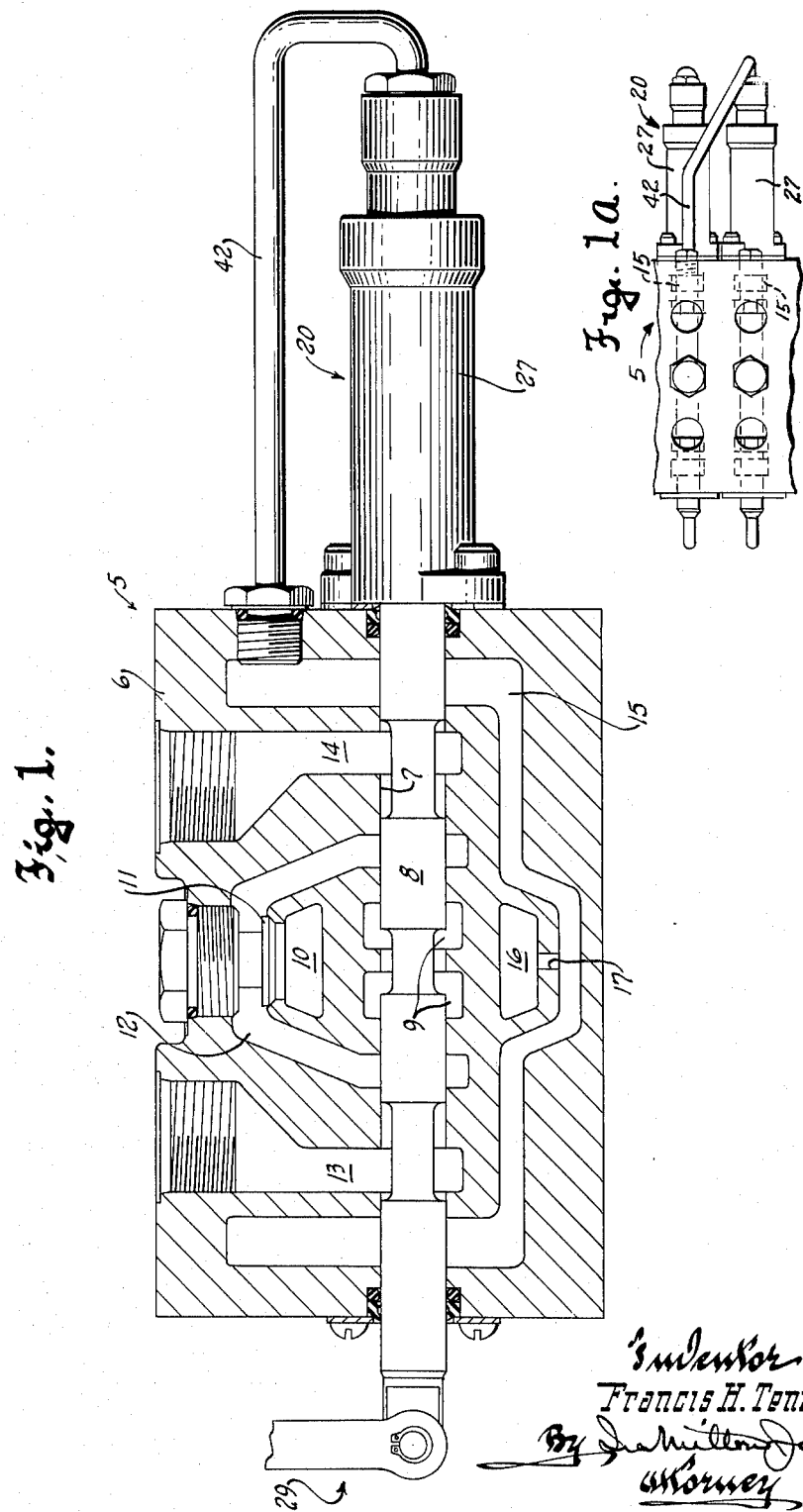
Inventor
Francis H. Tennis
By
Attorney

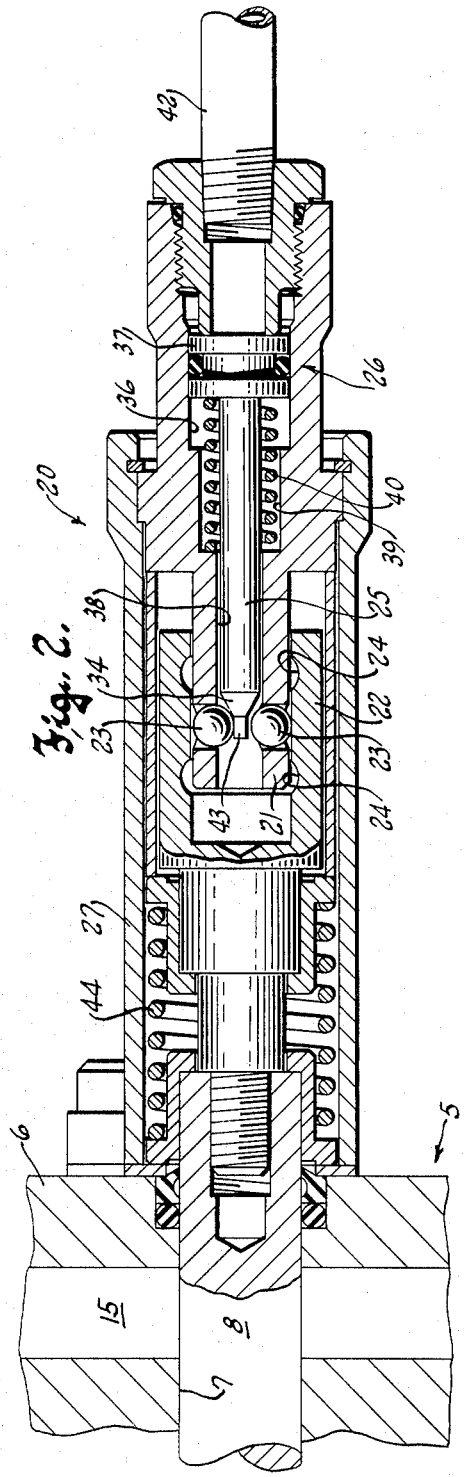
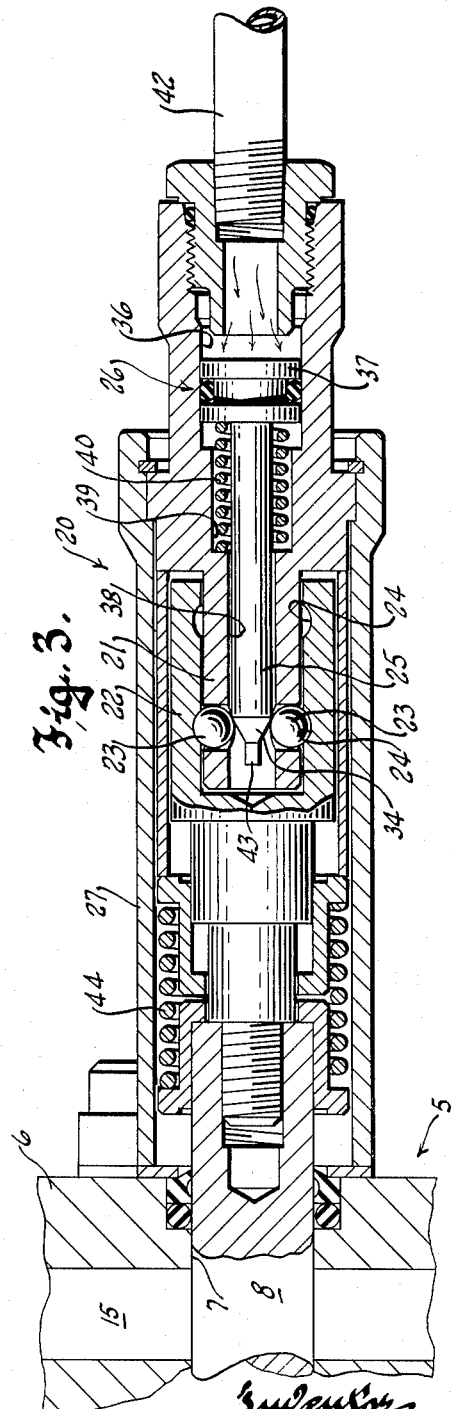

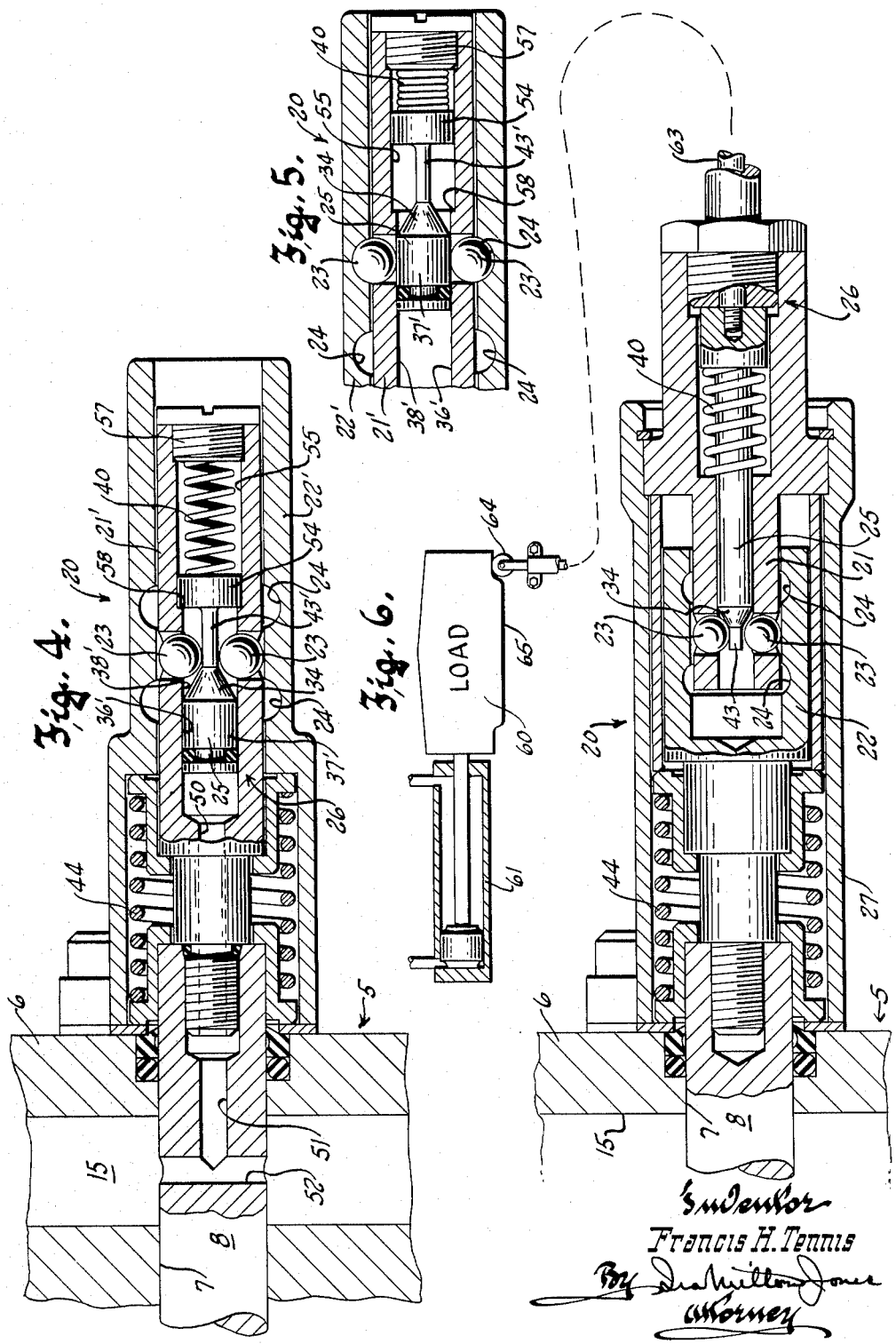

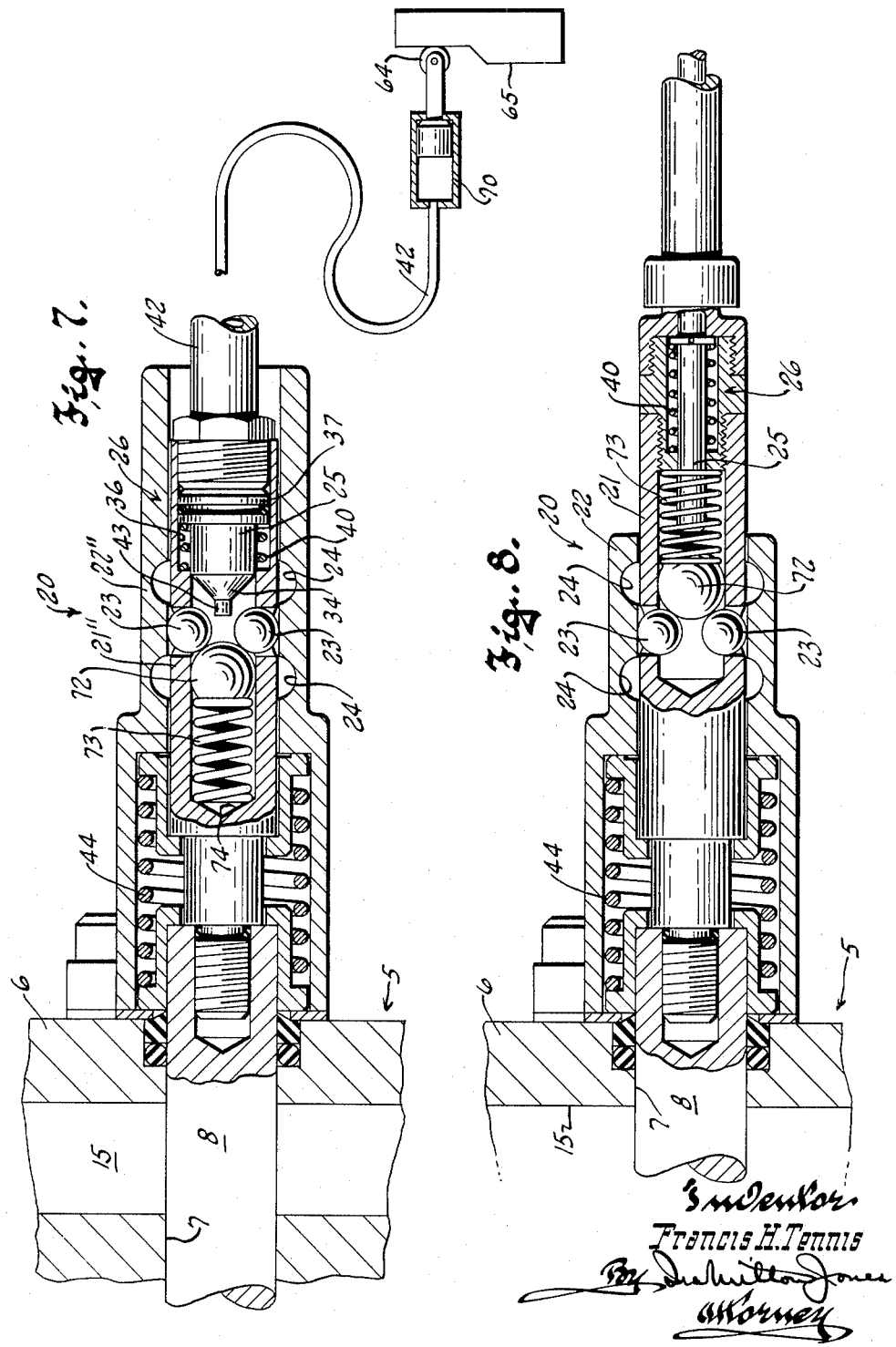

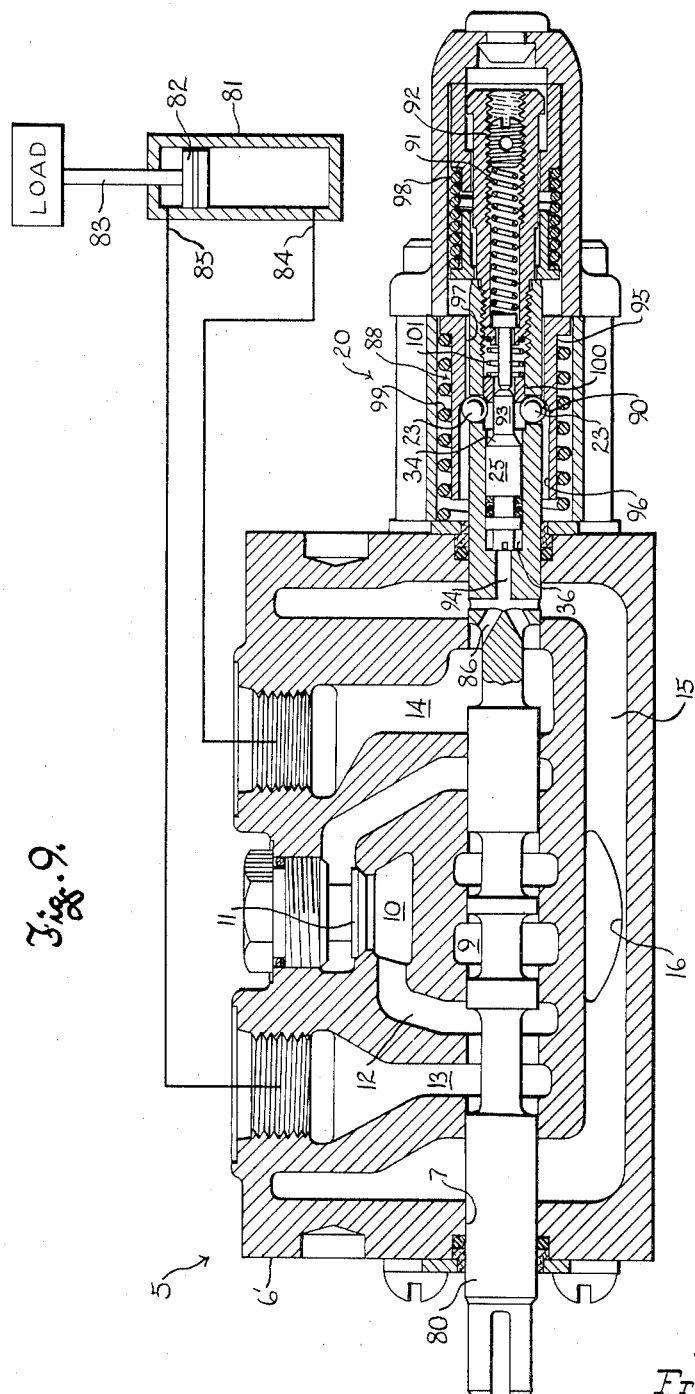

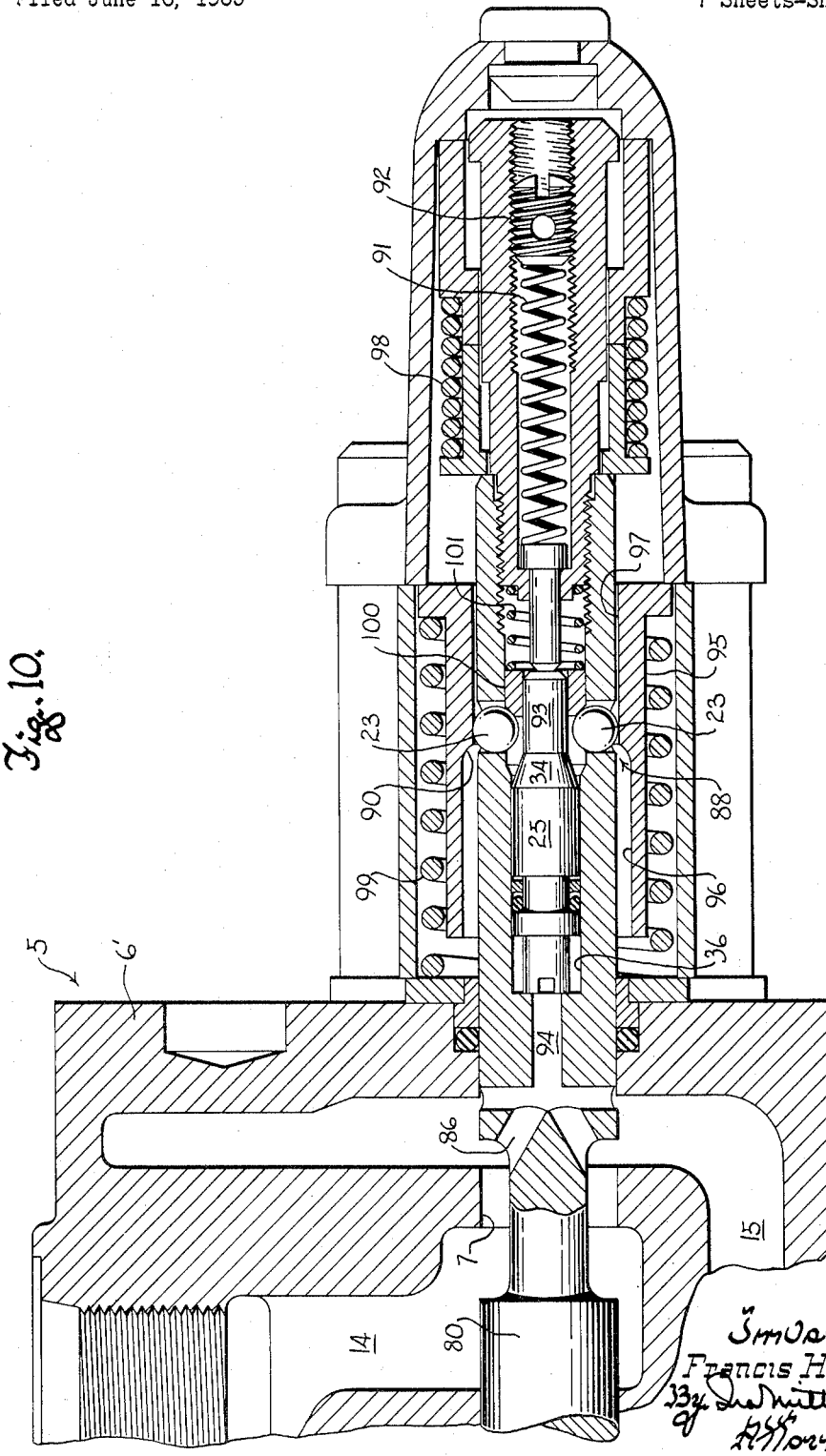

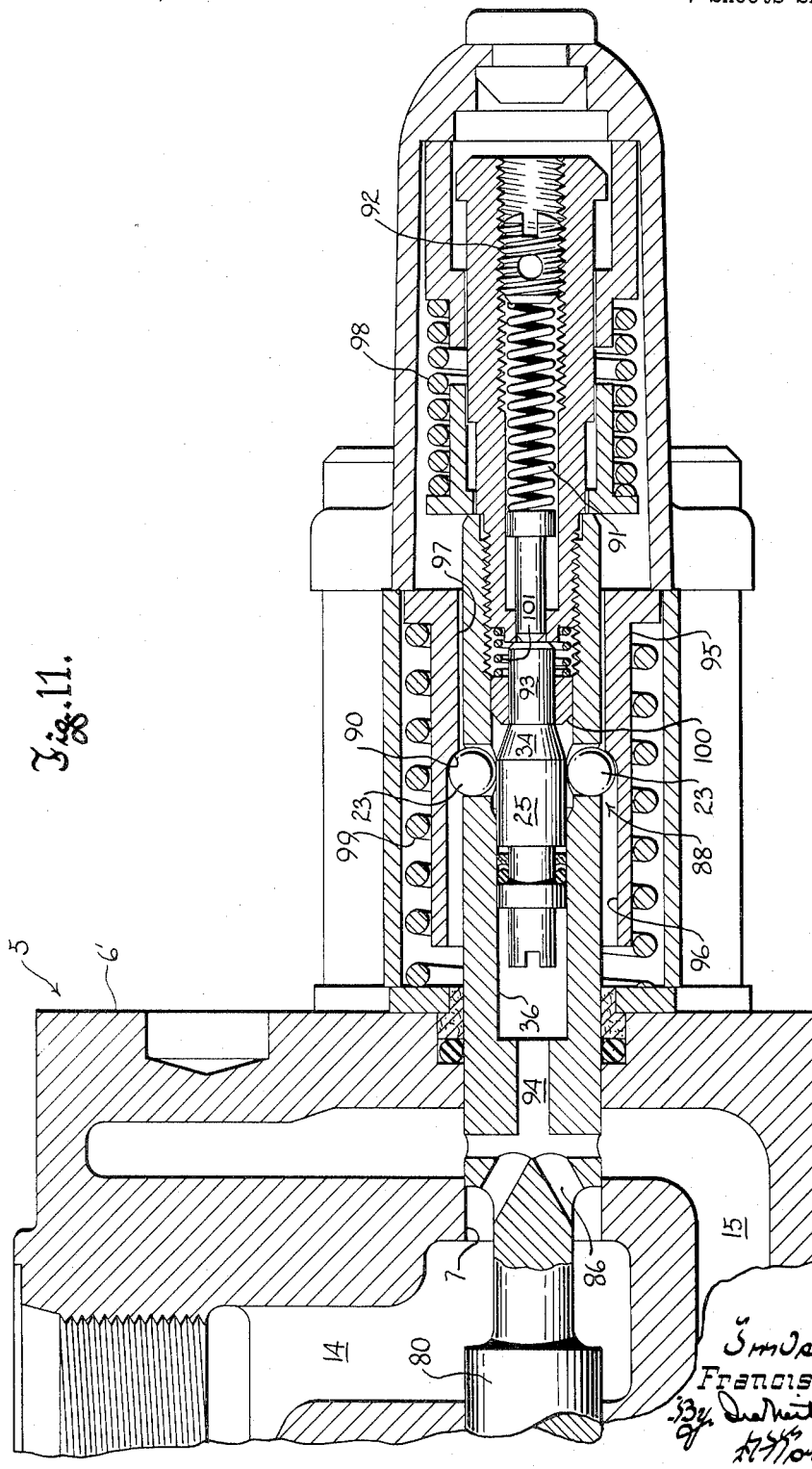

United States Patent Office 3,247,768
Patented Apr. 26, 1966

3,247,768
INTERLOCK FOR HYDRAULIC CONTROL
VALVES AND THE LIKE
Francis H. Tennis, Hartland, Wis., assignor to Hydraulic Unit Specialties Company, Pewaukee, Wis., a corporation of Wisconsin
Filed June 16, 1965, Ser. No. 467,816
17 Claims. (Cl. 91—189)

This application is a continuation-in-part of my copending application Serial No. 229,702, filed October 10, 1962, now abandoned. The subject matter common to this application and my aforesaid copending application relates to hydraulic control valves and similar control devices wherein a manually movable member is shiftable in opposite directions, and an interlock holds the manually movable member against being shifted out of a defined position during the time that an actuated element is moving toward a predetermined destination but releases the manually movable member for manipulation or for automatic return to a neutral position upon arrival of the actuated element at its destination.

Such interlocks for control devices of various kinds are of course not broadly novel. In one such type of interlock heretofore used with hydraulic control valves, the flow of fluid through the valve to a motor controlled thereby was utilized to produce a pressure drop directly across the valve member by which it was held open against the force of a return spring. When the motor reached the end of its stroke, the pressure drop across the valve no longer existed, due to the cessation of fluid flow through the valve body, so that the valve member could move in response to the bias of its return spring.

In another type of interlock heretofore widely used, the interlock comprised a detent mechanism or the like that was released by the increase in fluid pressure which occurred when a hydraulic motor controlled by the valve reached the end of its stroke.

Each of these prior types of interlocks was somewhat limited in its utility. In devices of the first mentioned type, wherein the valve element was locked in a defined position by a fluid pressure drop across it, the interlock could not be made responsive to the operation of a hydraulic motor other than the one controlled by the valve with which the interlock was associated, and therefore such an interlock could not be used to effect programming of a sequence of operations involving a plurality of motors. Those interlocks which relied upon pressure rise at the end of the motor stroke could not be used for programming a sequence of operations which contemplated travel of a motor through only a portion of its stroke, as for example to a motor position which might vary at each operation, and which was determined by an operator and established by his manual movement of a control member out of an operative position.

It will become apparent as the description proceeds that the present invention has as it general object to provide an interlock mechanism for hydraulic control valves and similar devices which is not subject to the limitations of prior devices, but which is, on the contrary, extremely versatile although very simple and inexpensive.

As examples of the versatility of the interlock mechanism of this invention: it can be arranged to respond to operation of a motor or other actuated element governed by the valve or other control with which the interlock mechanism is itself associated, or to respond to operation of an actuated element controlled by some other manual control or by an automatic control; it can be made to effect release of its associated manually movable member either when an actuated element reaches the end of its stroke, or reaches some other predetermined point in its stroke; and it can incorporate, if desired, a manually overridable detent mechanism, operative when the interlock is not engaged, and which defines one or more predetermined positions of the manually movable member with which the interlock cooperates, including the interlock position.

Another object of this invention is to provide an interlock mechanism of the character described which is especially well adapted for incorporation in a hydraulic control valve of the "stacked" or sectional type, wherein two or more valve body sections, each having its own valve element or spool, are adapted to be assembled with one another and with common inlet and outlet sections into a multiple valve unit capable of affording control of each of a plurality of hydraulic motors.

In this connection it is a further and more specific object of this invention to provide such an interlock for sectional valves wherein very little modification of the basic valve body section is required to accommodate the interlock, so that a given valve body section is readily available for use either with or without an associated interlock of this invention.

A further object of this invention is to provide a simple and very versatile interlock mechanism of the character described which has many elements in common with a known type of detent mechanism for hydraulic control valves and the like, and which therefore makes possible the manufacture of a basic hydraulic valve having either the interlock of this invention, a manually overridable detent mechanism, or an automatically releasable detent mechanism of the type disclosed in my Patent No. 3,128,-677, dated April 14, 1964, such conversion of the valve being effected by mere substitution or omission of certain parts.

Still another object of this invention is to provide an interlock mechanism for a hydraulic valve or the like which is capable of locking a manually movable control member in a defined position so long as an actuated element is in motion, and of effecting unlocking of the control member as soon as movement of the actuated element ceases, regardless of the position to which the actuated element may have travelled when its movement is stopped.

Hence it is also a specific object of this invention to provide an interlock of the character described which is particularly useful with stacked and other multiple hydraulic control valve arrangements in installations where it is desired to lock one of the valves in the system in a defined position so long as a motor controlled by another of the valves is in operation, and to release said one valve for manual manipulation as soon as operation of said motor terminates, whether by reason of its reaching the end of its stroke or because operation of the motor is stopped by manual movement of the valve that controls it.

The foregoing objects relate to subject matter common to this application and my aforesaid copending application Serial No. 229,702. The subject matter of this application which was not part of that copending application similarly relates to control valves having a movable valve element, and has as its main object the provision of locking means that is activatable to prevent movement of the valve element to one position thereof in response to a predetermined condition that obtains in a fluid pressure operated system with which the control valve is associated. The activation of the locking means in this instance, however, is not dependent upon movement of an actuated element but can be dependent upon pressure conditions obtaining in the system.

To cite one example, the locking means can be incorporated to considerable advantage in a speed and directional control valve on the order of that of my copending application Serial No. 230,524, filed October 15, 1962.

A speed and directional control valve is particularly useful for the control of the double acting lift cylinder of a fork lift truck, and features a valve element that is movable from a neutral or hold position to separate high and low speed fork raising positions, and also to separate high and low speed fork lowering positions. When stacking loads, a valve of this type can be actuated to its fast lower position to cause the empty fork to descend rapidly for the next load to be stacked, thus shortening work cycle time. Similarly, when loads are removed from a stack, the valve can be actuated to cause the fork to be raised at high speed to shorten the work cycle. The low speed positions of the valve are used when the loaded fork is raised or lowered.

With multispeed control valves of this type, however, there is always danger that an operator of the fork lift truck may actuate the control valve to its fast lower position at a time when the fork is heavily loaded. Under such conditions, the inertia of the descending heavily loaded fork can cause the truck to tip over endwise when the operator actuates the control valve to stop descent of the fork. When that occurs, of course, there is danger that the operator will be seriously injured, and breakage or other damage to the load can be quite costly.

It is another purpose of this invention, therefore, to provide a control valve having a movable valve element and locking means therefor that is activated in response to fluid pressure in a system governed by the valve to prevent movement of the valve element to one of its positions for as long as a predetermined fluid pressure condition obtains in the system.

In this respect, it is a further object of the invention to provide a control valve of the character described wherein the locking means comprises cooperating stop elements, one of which is actuatable to an operating position at which it is cooperable with the other to prevent movement of the valve element from one position to another as a consequence of a rise in fluid pressure in one of the control valve passages to a predetermined high value.

While these cooperating stop elements may be activated to prevent the valve element of a multispeed control valve from being actuated to a fast lower position, for example, it is another purpose of the invention to assure that the valve element will be freely movable between a neutral or hold position and a slow lower position, even though the stop elements have been activated to prevent movement of the valve element to a fast lower position.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of physical embodiments of the invention constructed according to the best modes so far devised for the practical application of the principles thereof, and in which:

FIGURE 1 is a cross sectional view of a "stacked" or sectional hydraulic control valve incorporating an interlock mechanism of this invention, said mechanism, however, being shown in elevation;

FIGURE 1a is a fragmentary plan view of a modified embodiment of the invention, at a reduced scale, illustrating how the interlock mechanism for one spool of a control valve can be controlled in correspondence with the operation of a motor governed by another spool of the valve;

FIGURE 2 is a longitudinal sectional view of the interlock mechanism illustrated in FIGURE 1, shown in its inoperative or releasing condition;

FIGURE 3 is a view similar to FIGURE 2 but showing the interlock mechanism in its operative or locking position;

FIGURE 4 is a longitudinal sectional view of a modified embodiment of the interlock mechanism of this invention, illustrated in its inoperative condition;

FIGURE 5 is a fragmentary longitudinal sectional view showing the interlock mechanism of FIGURE 4 in its operative or locking condition;

FIGURE 6 is a longitudinal section view of another embodiment of the interlock mechanism of this invention, shown in its releasing condition, and illustrating more or less diagrammatically its operative connection with an actuated element;

FIGURE 7 is a longitudinal sectional view of still another modified embodiment of the interlock mechanism of this invention incorporating provision for defining a manually overridable detent;

FIGURE 8 is a longitudinal sectional view of yet another modified embodiment of the interlock mechanism of this invention, again cooperating with means for providing a manually overridable detent;

FIGURE 9 is a sectional view through one of the control sections of a "stacked" control valve adapted for multispeed operation of a double acting hydrauliv cylinder, and incorporating another type of locking mechanism for the valve element in said section, the valve element being shown in a slow lower position;

FIGURE 10 is a fragmentary view of a portion of the valve seen in FIGURE 9, at an enlarged scale, and showing the valve element in its fast lower position; and FIGURE 11 is a view similar to FIGURE 10 but showing how the locking means prevents movement of the valve element from its slow lower to its fast lower positions.

Referring now more particularly to the accompanying drawings, the numeral 5 designates generally a hydraulic control valve which, for purposes of illustration, is shown as being of the sectional or "stacked" type, comprising one or more identical body sections 6 arranged in a side-by-side relation, in a well known manner, between inlet and outlet sections (not shown) at opposite ends of the stack.

In each body section there is a bore 7 in which an endwise slidable valve element or spool 8 is manually shiftable in opposite directions between a neutral position, in which it is illustrated in FIGURE 1, and either of a pair of operating positions at opposite sides of neutral. Fluid under pressure can enter each body section by way of an open center or through passage 9 that intersects the spool bore, and if the spool is in its neutral position such fluid is permitted to flow onward through the open center passage to the next body section.

If the spool is in one of its operating positions, it blocks the open center passage at the junction of the latter with the spool bore, diverting the pressure fluid to a feeder passage 10 which communicates with the through passage upstream from the spool bore. The feeder passage is in turn communicated, through a check valve 11, with a bifurcated bridge passage 12, the branches of which intersect the spool bore at zones spaced to opposite sides of its intersection with the through passage. Also intersecting the spool bore, at zones spaced axially outwardly of its intersections with the bridge passage branches, are a pair of service passages 13 and 14, connectable with opposite sides of a double acting hydraulic cylinder. If the spool is in its left hand operating position, it directs pressure fluid from the right hand branch of the bridge passage 12 to the right hand service passage 14. Return fluid from the motor, which enters the valve body by way of the left hand service passage 13, is directed by the spool to a U-shaped return fluid passage 15, the legs of which intersect the spool bore at zones axially outward of its intersections with the service passages. From the return fluid passage the exhaust fluid passes to the outlet in the valve body, for return to a reservoir (not shown) or similar source of unpressurized fluid, by way of an outlet passage 16, which may be communicated with the return fluid passage through a throttling restriction 17.

Obviously if the spool is shifted to its right hand operating position, it effects diversion of pressure fluid to the left hand service passage 13 while return fluid from the service passage 14 is sent to the return fluid passage 15 and hence to the outlet passage 16.

Under certain circumstances it is desirable that the spool be locked in a predetermined position, which may be either its neutral position or one or the other of its operating positions, so long as a monitored hydraulic motor is in operation. The monitored motor may be that which is controlled by the spool itself, so that the interlock prevents the spool from being shifted out of an operating position until the motor reaches the end of its stroke, or the monitored motor may be one controlled by another valve, in which event the interlock is provided to compel manipulation of the valves in a predetermined sequence or program.

In either event the interlock mechanism of this invention, which is designated generally by the numeral 20, provides for holding the manually movable valve element against being shifted during the time that the monitored motor is in operation, and provides for release of the valve element as soon as the monitored motor stopss. The interlock mechanism comprises inner and outer tubular members 21 and 22, assembled in telescoping relation and one of which is axially slidable relative to the other, and locking means 23 carried by the inner tubular member 21 and constrained to radially in and out motion relative to the inner member, toward and from a projected position of engagement in any one of a plurality of inwardly opening circumferential grooves 24 in the outer tubular member. The mechanism also includes a plunger-like retaining member 25 carried by one of the tubular members for axial motion toward and from a locking position in which the retaining member is engaged with the locking means to hold the same in its projected position, and means connectable with a motor to be monitored and providing for actuation of the retaining member to and from its locking position, said last named means being generally designated 26.

In the embodiment of this invention illustrated in FIGURES 1, 2 and 3, the outer tubular member 22 is secured to the spool 8 of the valve with which the interlock is associated, for axial sliding motion in unison with the spool, while the inner tubular member 21 is fixed to the valve body 6, or more specifically to the axially outer end portion of a tubular housing 27 which at its inner end is attached to the valve body coaxially with the spool and which encloses the interlock mechanism. As may be seen from FIGURE 1, the interlock mechanism is located at the opposite side of the valve body from a manual actuator 29 for the spool.

In this instance the locking means 23 comprises a plurality of satellite balls confined in substantially loosely fitting radial holes in the inner tubular member. When the spool is moved out of its neutral position shown in FIGURES 1 and 2, the outer tubular member of course moves with it, and as the spool comes to one or the other of its operating positions, one of the inwardly opening circumferential grooves 24 in the outer tubular member is brought into register with the satellite balls. The plunger-like retaining member 25 has a substantially conical cam portion 34 at one end thereof, and when the retaining member is moved axially from its inoperative or releasing position, shown in FIGURE 2, to its locking position shown in FIGURE 3, this cam surface engages the balls, propelling them radially outwardly and holding them in the groove so long as the retaining member stays in its locking position.

In FIGURES 1, 2 and 3, the means 26 for actuating the retaining member comprises a hydraulic cylinder 36 provided by a counterbore in the axially outer end portion of the inner tubular member 21, and a piston 37 snugly but slidably received in the cylinder 36 and to which the retaining member is rigidly coaxially fixed. The axially inner end portion of the inner tubular member, in which the satellite balls are confined, has a smaller coaxial bore 38 of such diameter as to provide sliding guidance for the retaining member, while the medial portion of the inner tubular member has a coaxial bore 39 of intermediate diameter that communicates with the small diameter bore 38 and with the counterbore defining the hydraulic cylinder 36, and in which is housed a spring 40 that reacts between the piston 37 and the inner tubular member to bias the retaining member axially outwardly, away from its locking position.

Through a duct 42, the cylinder 36 is communicated with the return fluid passage 15 of the valve controlling the monitored motor. The monitored motor, as suggested by FIGURE 1, can be either that controlled by the valve with which the interlock is associated or a motor controlled by another valve in the same stack, as seen in FIGURE 1a; but in either event return fluid from the monitored motor enters the return fluid passage 15 in its control valve body under some degree of pressure, which pressure is likewise manifested upon the piston 37 of the interlock mechanism through the communication afforded by the duct 42.

Hydraulic fluid under pressure in the cylinder 36 drives the piston 37 axially inwardly, against the bias of the spring 40, to carry the retaining member to its locking position. Release of pressure upon fluid in the cylinder when flow of return fluid from the monitored motor terminates permits the retaining member to return to its unlocking position in response to the bias of spring 40. When the retaining member is in its releasing position, a small diameter coaxial nose 43 on its axially inner end remains engaged with the satellite balls 23 to prevent them from dropping inwardly out of the radial bores in which they are confined.

To some extent the operation of the interlock is rendered more positive by the provision of the throttling restriction 17 that communicates the return fluid passage 15 with the outlet passage 16, since such restriction tends to cause fluid flowing in the return fluid passage to be under substantial pressure; but even if communication between passages 15 and 16 were substantially unrestricted there would be pressure on fluid in the return fluid passage whenever the motor was in operation, thus providing for maintenance of the retaining member in its locking position until operation of the motor stops, whereupon fluid in the return passage 15 of course drops down to reservoir pressure, as does fluid in the cylinder 36, permitting the spring 40 to return the retaining member to its unlocking position.

If the duct 42 is connected to the return fluid passage of the valve with which the interlock mechanism is operatively associated, then once the spool of that valve is shifted to an operating position, said spool remains locked in that position until the motor controlled thereby reaches the end of its stroke. If desired, a conventional centering spring 44 can be provided to automatically return the spool to its neutral position upon release of the interlock.

If the interlock mechanism cooperates with a spool of the valve other than that with which its duct 42 is connected, as is the case in the embodiment seen in FIGURE 1a, then the retaining member of the interlock mechanism will remain in its locked position all during an operation of the motor controlled by the valve with which its duct is connected, but will go to its unlocking position as soon as operation of the monitored motor terminates, whether by reason of such motor reaching the end of its stroke or because the operator returns the control valve for the monitored motor to its neutral position.

Obviously, the outer tubular member 22 can be provided with a third groove, similar to and intermediate the illustrated grooves 24, arranged to register with the satellite balls 2 when the spool is in its neutral position, or could be provided only with a groove for its neutral position. Hence, by proper arrangement of the grooves 24 the interlock can provide for locking the spool in any of its operating positions and/or in its neutral position.

The modified embodiment of the invention illustrated in FIGURES 4 and 5 is intended to lock a valve spool in an operative position until a motor controlled by the valve reaches the end of its stroke, and then to release the spool for return to its neutral position, either manually or in response to the biasing force of a centering spring 44.

In this case, the outer tubular member 22', which has the grooves 24 therein, is fixed to the valve body coaxially with the spool bore and provides a housing for the interlock mechanism, while the inner tubular member 21' is connected with the spool to move in unison therewith. The locking means 23 again comprises satellite balls confined in radial holes in the inner tubular member, and the retaining member 25 is axially slidable relative to the inner tubular member, toward and from a locking position in which it holds the balls projected into one or the other of the grooves. Again the retaining member is actuated by a piston 37' which is slidable in a hydraulic cylinder 36' and which is rigidly connected with the retaining member 25 to move it toward its locking position when fluid pressure is manifested in the return passage 15 in the valve body. In this case, however, the hydraulic cylinder 36' comprises a coaxial bore 38' in the axially medial portion of the inner tubular member. Coaxial bores 50 and 51 in the axially inner portion of the inner tubular member and the adjacent end portion of the spool communicate the cylinder 36' with a transverse bore 52 in the spool, so located along the length of the spool as to be at all times in register with the return fluid passage 15. Hence fluid pressure in the hydraulic cylinder 36' always corresponds to that in the return fluid passage 15.

The reduced diameter nose 43' on the retaining member, by which the balls are retained against displacement out of their radial bores when the retaining member is in its unlocking position, is substantially elongated and terminates at its axially outer end in a head 54 of a diameter to be guidingly received in a counterbore 55 in the outer end portion of the inner tubular member. The counterbore houses a spring 40 which reacts between the head 54 and a plug 57 fixed in the mouth of the counterbore 55, and which urges the retaining member toward its releasing position. In this case, it will be noted, movements of the retaining member to and from its locking position are respectively opposite to those in the FIGURES 1–3 embodiment of the invention, that is, fluid pressure in the return fluid passage 15 moves the retaining member axially outward to its locking position and the spring 40 urges it axially inward toward its releasing position. The axially outwardly facing shoulder 58 defined by the junction of the bore 38' in the inner tubular member with the counterbore 55 is engageable by the head 54 to define the releasing position of the retaining member, and prevents the retaining member from being moved axially inwardly by the spring 40 to the point where the head 54 would engage the satellite balls.

It will be observed that the bodies of the hydraulic valves illustrated in FIGURES 1–5 can be completely conventional, except that in the structure illustrated in FIGURES 1–3 a short outlet must be bored from the return fluid passage 15 to provide for communication of the duct 42 therewith. No alteration whatsoever need be made in the valve body to adapt it for the FIGURES 4–5 embodiment of the invention, and the passage 51, 52 in the spool can be very easily formed. In the embodiments of the invention described hereinafter no modifications need be made in either the valve body or the spool to adapt a valve having a conventional detent or automatically releasable detent mechanism for the interlock of this invention.

In the embodiment of the invention illustrated in FIGURE 6 the interlock is responsive to the position of an actuated element which is represented as a load 60 driven by a double acting hydraulic cylinder 61. The monitored motor or cylinder 61 may be controlled by the hydraulic valve with which the interlock mechanism is operatively associated, or by another valve as described previously.

In this case the interlock mechanism is generally similar to that illustrated in FIGURES 1–3, in that the inner tubular member 21, which carries the locking means or satellite balls 23, is fixed to a tubular housing which is secured to the valve body, while the outer tubular member 22, in which are formed the grooves 24 in which the balls are engageable, is secured to the spool 8 of the valve to move in unison therewith. The plunger-like retaining member 25 is likewise similar to that of FIGURES 1–3, but is actuated mechanically, rather than hydraulically, by means of a push-pull cable 63, to one end of which the retaining member is connected. The other end of the push-pull cable is connected with a cam follower 64 that cooperates with a movable cam member 65 carried by the actuated element.

In the present case, the cam member 65 is so arranged as to permit the retaining element to be moved to its unlocking position, in response to the bias of its spring 40, at each limit of travel of the actuated element, and to cammingly propel the retaining member to its locking position and hold it therein as the actuated element moves out of either of its limit positions and until it again arrives at one or the other of its limit positions. Obviously the cam member can provide any other desired relationship between the position of the actuated element along its path of travel and the locking and releasing positions of the retaining member, simply by suitable arrangement of the highs and lows on the cam member 65 along the length thereof.

The embodiment of the invention illustrated in FIGURE 7 provides a manually overridable detent that defines one or more positions of the spool, as well as an interlock that prevents manual displacement of the spool out of any one of such positions until an actuated element reaches a predetermined position.

In this case the inner tubular member 21", which as usual carries the locking means or satellite balls 23, is connected with the spool 8 to move therewith, while the outer tubular member 22", in which the grooves 24 are formed, is fixed to the valve body. The retaining member 25 is generally similar to that in the embodiment of the invention illustrated in FIGURES 1–3, although the nose 43 thereon is substantially shorter and may even be eliminated because the nose is not relied upon to prevent displacement of the balls out of their radial bores.

The actuator 26 for the retaining member comprises a hydraulic cylinder 36, formed in the axially outer end portion of the inner tubular member, and a piston 37 slidable in said cylinder and rigidly connected with the retaining member. A flexible duct 42 communicates the cylinder 36 with a small plunger pump 70 of well known type which is connected with a cam follower 64 that cooperates with a cam element 65 driven by the actuated element or monitored motor. The highs on the cam of course actuate the plunger pump to impose pressure upon fluid in the cylinder 36. The cam element is similar to that illustrated at 65 in FIGURE 6, and in fact those skilled in the art will appreciate that the hydraulic actuator shown in FIGURE 7 is the equivalent of the mechanical push-pull cable actuator shown in FIGURE 6, the two types of actuators being essentially interchangeable with one another.

The retaining member 25 in the FIGURE 7 embodiment of the invention is biased axially outwardly toward its releasing position by means of a spring 40 that can be arranged to react between the inner tubular member 21" and the piston 37. With the retaining member in its axially outward releasing position, a yielding radially outward bias is maintained upon the balls 23 by means of a cam member comprising a sun ball 72 that is urged axially outwardly by a detent spring 73 which reacts between the sun ball and an axially outwardly facing shoulder 74 on the inner tubular member, near the axially inner end thereof. With the retaining member in its releasing position, the bias exerted upon the satellite balls by the detent spring 73, acting through the sun ball 72, causes the satellite balls to engage with a detent action in any one of the grooves 24 with which they may be brought into alignment upon shifting of the spool. However when the actuator moves the retaining member to its locking position, the nose 43 on the retaining member engages the sun ball, displacing it axially inwardly against the bias of the detent spring 73 and out of engagement with the satellite balls, and the conical cam surface 34 on the retaining member engages the satellite balls to confine them against displacement out of the groove in which they are engaged, in the manner heretofore described.

In the embodiment of the invention illustrated in FIG-URE 8 the detent mechanism is virtually identical with that of FIGURE 7, and again a sun ball 72 is provided which is biased into camming engagement with the satellite balls by means of a detent spring 73. In this case, however, the sun ball is disposed between the satellite balls and the retaining element 25 and the detent spring 73 biases it axially inwardly, that is, in the direction opposite to that in which the retaining member is based by its spring 40. When the retaining member is in its axially outward releasing position, the sun ball, the detent spring and the satellite balls cooperate with the grooves 24 in the usual manner to provide manually overridable detents at the spool positions defined by the grooves. However when the retaining member is actuated to its locking position it engages the sun ball to hold the latter in the position in which it confines the satellite balls against radially inward motion out of any groove 24 in which they are engaged, thus locking the spool against shifting until such time as the retaining member is permitted to return to its releasing position.

Those skilled in the are will now recognize that the embodiment of the invention illustrated in FIGURES 4 and 5 requires only very slight modification to enable it to provide the same type of overridable detent action as is obtained with the FIGURES 7 and 8 embodiments of the invention. Specifically, it is only necessary to provide an axially inwardly tapering cam surface on the head 54 in the structure of FIGURES 4 and 5, which cam surface would be arranged to engage balls 23 when the retaining member is in its releasing position, and would cammingly transmit to the balls the biasing force exerted by the spring 40 to thus urge the balls radially outwardly toward detent defining engagement with the grooves 24.

FIGURES 9, 10 and 11 illustrate how a variation of the locking means comprising the satellite balls 23 described previously can be employed to prevent movement of the valve element or spool 80 of a speed and direction control valve from one position to another during the time a certain condition obtains in a hydraulic system with which the valve is associated. The valve has a body 6' generally like that of the control valve described earlier, and its spool 80 is adapted to control a double acting lift cylinder 81 having a piston 82 and a rod 83 projecting from the upper end of the cylinder for connection with a load such as the fork of a fork lift truck.

The port 84 in the head end of the cylinder is communicated with the service passage 14, while the port 85 in the rod end of the cylinder is communicated with the other service passage 13.

In its neutral or hold position, the spool 80 prevents escape of hydraulic fluid from the head end of the cylinder to thus hold the load at any given elevation. The spool, however, has grooves in its exterior which cooperate with the passages in the valve body to effect either slow or fast raising of the load depending upon whether the spool is shifted to first or second operating positions to the left of neutral, and to effect either slow or faster descent of the load depending upon whether the spool is shifted to third or fourth operating positions to the right of neutral. The spool 80 has been shown in its third operating position in FIGURE 9, at which it effects slow descent of the load.

In its slow lower position, the spool 80 causes pressure fluid to flow out through the service passage 13 to the rod end of the cylinder, and directs return fluid entering the other service passage 14 from the head end of the cylinder to the exhaust passage 15. The spool, however, communicates the passages 14 and 15 through a restricted passage 86 in the spool, which meters the flow of return fluid exhausting from the head end of the cylinder and thus slows descent of the load connected therewith.

If the spool is shifted to its fourth operating position, to the right of its position seen in FIGURE 9 and shown in FIGURE 10, the restricted passage 86 in the spool is no longer effective to meter the exhaust from the head end of the cylinder, and supply fluid flowing into the rod end of the cylinder causes the load to descend at a faster rate due to the more or less free flow of return fluid from the head connected service passage 14 to the exhaust passage 15.

According to this invention, locking means generally designated 88 is provided to prevent movement of the control spool 80 to its fast lower position seen in FIGURE 10 in the event the pressure of fluid in the service passage 14 rises to or exceeds a predetermined value. Bearing in mind that the pressure of fluid in the service passage 14 is proportional to the load connected to the work performing element of the cylinder 81, there will be times when it is unsafe and even dangerous to lower the load at a rate any faster than is permitted by the restricted passage 86 in the spool 80 in the slow lower position thereof seen in FIGURE 9. This is especially true where the cylinder 81 is installed on a fork lift truck, for example, and has its work performing element connected with the fork to lift and lower the same at the dictation of the control valve. If the fork is lightly or moderately loaded, it is desirable and perfectly safe for the operator to shift the valve spool 80 to its fast lower position to save time in lowering the load represented by the fork and whatever materials or objects are carried thereby. It is unsafe, and even dangerous, however, to effect lowering of the fork when it is heavily or excessively loaded, as the lift truck can then be upset by high inertia forces that occur substantially instantaneously when the operator shifts the control spool back to neutral to stop the descent of the fork at the desired level.

The locking means 88, in this instance, similarly comprises a number of satellite balls 23, and a retaining member or plunger 25. The plunger is movable axially in a pressure chamber or cylinder 36, formed in an extension of the valve spool 80, from a normally inoperative position seen in FIGURE 9 to an operative position seen in FIGURE 11 at which it locks the balls 23 in an outwardly projected position at which they are cooperable with a stop 90 to prevent the spool from being shifted to its fast lower position. The plunger is yieldingly biased toward its normally inoperative position by a spring 91 with a force that can be set by an adjusting screw 92 to a value substantially corresponding to a normal or moderate load upon the cylinder 81, and which force is overcome by an excessive load on the cylinder.

As before, the balls 23 are mounted in radial holes in the wall of the tubular carrier provided by the axially extended spool, so that they are constrained to move axially with the spool although they can move radially relative to the carrier in their radial holes. They are normally grouped around a reduced outer end portion 93 on the plunger, at a location axially outwardly of a cam surface 34 thereon which diverges axially inwardly toward the non-reduced portion of the plunger. An axial passage 94 in the valve spool communicates the pressure chamber 36 with the restricted passage 86 in the spool, so that in either the neutral or slow lower position thereof, fluid will be maintained in the chamber behind the plunger at a pressure depending upon the magnitude of the load on the cylinder 81.

The outer tubular member 95, which concentrically surrounds the carrier, is here shown provided with a counterbore 96, opening axially inwardly toward the valve body from its bore 97. While the outer tubular member can slide toward the valve body, as when the control spool is shifted to its fast raise position, it is held against axial movement in the opposite direction, and can be considered as fixed with respect to the valve body to facilitate understanding of the operation of the locking means 88. The satellite balls 23 normally lie opposite the reduced outer portion 93 on the plunger, which provides clearance for the balls enabling them to be moved into the bore 97 in the outer tubular member 95 when the valve spool is shifted to its fast lower position seen in FIGURE 10, as long as the load on the cylinder 81 is not excessive. When the load is excessive, however, the plunger 25 responds to load pressurized fluid in the chamber 36 and is moved axially outwardly thereby to an active position such as seen in FIGURE 11, where its non-reduced portion is engaged between the satellite balls to hold them in the counterbore 96, where they are cooperable with the stop 90 provided by the bottom of the counterbore to prevent movement of the valve spool to its fast raise position. Such propulsion of the plunger to its active position can be effected in either the neutral or slow lower position of the valve spool, although it will ordinarily occur when the spool is in its neutral position.

It is important to note that the valve spool is more or less freely movable between its neutral and slow lower positions at times when the plunger is in its active position precluding movement of the spool to the fast lower position thereof. This, of course, allows an excessive load to be safely lowered at a slow rate.

Another feature of the valve shown in this embodiment of the invention is that it can afford to the operator an indication, by feel, when he has shifted the spool past either a slow raise or a slow lower position. This is accomplished in part by the satellite balls 23 without in anywise interfering with their operation as locking means, and in part by differential centering springs 98 and 99 for the valve spool. The spring 98 is first compressed during movement of the valve spool from neutral to its slow raise position, and the stronger spring 99 is next compressed as the operator shifts the spool toward its fast raise position. The latter spring thus requires the operator to exert greater actuating force on the spool and thereby enables him to ascertain that the spool is moving toward its fast raise position.

The spring 98 also resists movement of the valve spool to its slow and fast lower positions, and the operator is made aware of the fact that he is moving the spool to its fast lower position by the engagement of the satellite balls 23 with the bottom 90 of the counterbore in the outer tubular member 95. For this purpose, the balls 23 are normally yieldingly held in outward projected positions in the counterbore by means of an annular cam member 100 slidably seated on the reduced stem portion 93 of the plunger 25 with its cam surface opposed to the cam surface 34 on the plunger and at the side of the satellite balls 23 remote therefrom. This cam member is yieldingly biased into camming engagement with the satellite balls 23 by a light coil spring 101, which allows the cam member to slide axially outwardly under the force which the satellite balls exert thereon as they are cammed inwardly by the stop 90 during movement of the valve spool from its slow lower to its fast lower position under normal load conditions on the cylinder. Such inward camming of the satellite balls, of course, momentarily requires additional force to be applied to the valve spool by the operator and, the slight interference to smooth and uninterrupted movement of the valve spool to its fast lower position indicates to the operator that he is moving the spool past its slow lower position toward its fast lower position.

From the foregoing description taken together with the accompanying drawings, it will be apparent that this invention provides an interlock for a manually movable member, such as a hydraulic control valve spool which is shiftable in opposite directions to and from a defined position, which interlock is capable of holding the manually movable member in its defined position until an actuated element driven by a monitored motor reaches a predetermined destination. It will also be apparent that the interlock of this invention is simple and effective in operation, extremely versatile in its range of applications, but nonetheless inexpensive, especially since it can embody many of the parts of a known detent mechanism, and is adaptable to sectional type hydraulic control valves without requiring more than minor modification of the body of such a valve.

It will further be apparent that a variation of this interlock can be most advantageously employed in a plural speed control valve to prevent the spool thereof from being moved to a fast load lowering position at times when the load on the cylinder governed by the valve is excessive.

What is claimed as my invention is:

1. In a control valve of the type having a body member and a valve member movable therein to each of a plurality of positions to control fluid flow through passages in the valve body, means for preventing movement of the valve member to one of said positions whenever a predetermined condition obtains in a fluid pressure operated system with which the control valve is associated, comprising:

(A) cooperating stop elements carried by the body and valve members, one of which is movable toward and from an operative position at which it is cooperable with the other stop element to prevent movement of the valve member to said one position thereof;

(B) a retaining element cooperable with said movable stop element;

(C) means mounting the retaining element on one of said members for movement relative thereto from an active position at which it holds the movable stop element in its operative position, to an inactive position at which it releases the movable stop element for movement out of its operative position;

(D) yieldable biasing means urging the retaining element toward its inactive position;

(E) and actuating means carried by one of said members for effecting movement of the retaining element to its active position in response to a signal that reflects a predetermined condition in a fluid pressure operated system with which the control valve is associated.

2. The control valve of claim 1, wherein said retaining element is a plunger that is movable to its active position in response to fluid pressure force exerted thereon; and further characterized by means for subjecting the plunger to the force of fluid pressure obtaining in one of the passages in the body member.

3. In a control valve of the type having a body member and a valve member movable therein to each of a plurality of positions to control fluid flow through passages in the valve body, means for preventing movement of the valve member to one of said positions whenever a predetermined condition obtains in a fluid pressure operated system with which the control valve is associated, comprising:
- (A) cooperating stop elements carried by the body and valve members, one of which is movable toward and from an operative position at which it is cooperable with the other stop element to prevent movement of the valve member to said one position thereof;
- (B) a retaining element cooperable with said movable stop element;
- (C) control means for the movable stop element adapted to sense conditions in a fluid pressure operated system with which the control valve is associated and to be moved to an active position holding the movable stop element in its operative position in response to and for as long as a predetermined condition obtains in the system;
- (D) and yieldable biasing means acting upon said control means to urge it toward an inactive position at which it releases the movable stop element for motion out of its operative position.

4. In a hydraulic control valve of the type having a body and a valve member movable therein to each of a plurality of positions to control fluid flow through passages in the valve, means for preventing movement of the valve member to one of said positions whenever a predetermined condition obtains in a fluid pressure operated system with which the control valve is associated, comprising:
- (A) a pair of tubular members assembled in telescoping relation, one thereof being connected to the valve member for movement in unison therewith and the other being fixed;
- (B) cooperating stop elements carried by said tubular members, that on one of said tubular members being movable radially relative thereto between an inoperative position permitting movement of the valve member to said one position thereof and an operative position at which it is cooperable with the other stop element to prevent movement of the valve member to said one position;
- (C) a retaining member carried by one of said tubular members and movable axially back and forth relative thereto between active and inactive positions;
- (D) yieldable biasing means urging the retaining member toward its inactive position;
- (E) means through which the retaining member acts to hold the radially movable stop element in its operative position whenever the retaining member is in its active position;
- (F) and actuating means carried by one of the tubular members for effecting movement of the retaining member to its active position in response to a signal that reflects a predetermined condition in a fluid pressure operated system with which the control valve is associated.

5. In a hydraulic control valve of the type having a body with inlet passage means and a plurality of outlet passage means, and a valve member movable to a plurality of positions to control communication between the inlet passage means and the outlet passage means, means for preventing movement of the valve member to one of said positions whenever the pressure of fluid in one of said passage means reflects a predetermined condition in a fluid pressure operated system governed by the control valve, said means comprising:
- (A) a pair of tubular members assembled in telescoping relation, one thereof being connected to the valve member for motion in unison therewith and the other being fixed;
- (B) cooperating stop elements carried by said tubular members, one of which is movable relative to its tubular member between an operative position at which it is cooperable with the other stop element to prevent movement of the valve member to said one position thereof, and an inoperative position permitting movement of the valve member to said one position;
- (C) means in one of said tubular members defining a pressure chamber;
- (D) a plunger in the pressure chamber operatively associated with said movable stop element to hold the same in its operative position in consequence of fluid pressure produced actuation of the plunger in one direction in the chamber;
- (E) means on the valve member operable in one of its said positions to communicate the pressure chamber with said one passage means so that pressure fluid in the latter can enter the chamber and exert force on the plunger tending to actuate the same in said direction;
- (F) and means yieldingly opposing such actuation of the plunger with a force that exceeds the actuating force which fluid in the chamber below a predetermined pressure value imposes upon the plunger, but which opposing force can be overcome by the actuating force which fluid in the chamber at a pressure above said predetermined value exerts on the plunger.

6. A hydraulic control valve of the type characterized by a body member having a service passage, an exhaust passage, and a movable valve member which, in a first operating position is adapted to effect flow of return fluid from the service passage to the exhaust passage at one rate and which in a second operating position, is adapted to effect flow of return fluid from the service passage to the exhaust passage at a higher rate, said valve being further characterized by:
- (A) cooperating locking means carried by the body and valve members and activatable to prevent movement of the valve member to its second operating position, said locking means including a pressure responsive member which must be moved from a non-locking position to a locking position in order to activate the locking means;
- (B) means for effecting movement of said member to its locking position in response to the pressure of fluid obtaining in the service passage;
- (C) and means yieldingly biasing said pressure responsive member toward its non-locking position with a force that exceeds the force applied thereto by pressure fluid at moderate values in the service passage, but which biasing force is overcome by the greater opposing force exerted on said pressure responsive member when the pressure of fluid in the service passage rises to a predetermined value.

7. In a hydraulic control valve of the type having a body with a service passage that is connectable with the head end of a lift cylinder, a supply passage communicable with the service passage to cause lifting of a load connected to the cylinder, an exhaust passage which is communicable with the service passage to cause lowering of the load, and a movable valve element for selectively communicating the service passage with either the supply passage or the exhaust passage:
- (A) cooperating passage defining means in the body and the valve element operable in a first position of the valve element to communicate the service and exhaust passages for return flow of fluid to the latter pasage at one rate and operable in a second position of the valve element to effect return flow of fluid from the service passage to the exhaust passage at a higher rate;

(B) cooperating locking means carried by the body and the valve element for preventing movement of the latter to its second operating position, said locking means including
    (1) a stop element which is movable from a nonlocking to a locking position, and
    (2) a pressure responsive actuator sensitive to the pressure of fluid in the service passage for holding said element in its locking position when actuated by force which such fluid exerts thereon;

(C) and spring means acting upon said actuator to yieldingly prevent the same from actuation to its locking position as long as the pressure of fluid in the service passage does not exceed a predetermined high value.

8. The control valve of claim 7, wherein said cooperating locking means includes a body carried stop element past which the movable stop element must be moved during actuation of the valve element to said second position thereof, but which is engaged by the movable stop element when the latter is in its locking position to prevent movement of the valve element to said second position thereof; and further characterized by spring biased cam means acting upon the movable stop element to normally hold it in its locking position without interfering with retraction of the movable stop element from its locking position by its engagement with the body carried stop element during actuation of the valve element to its second position, such retraction of the movable stop element being yieldingly resisted by the bias on the cam means whereby said bias is detectable to an operator of the control valve to enable him to ascertain when the valve element is moved to its second position.

9. A hydraulic control valve for governing the operation of a lift cylinder, and of the type comprising a body member having a service passage which is connectable either in supply or exhaust relation with the head end of the cylinder under the control of a valve member in the body member in selected operation positions of the valve member, and which valve member is operable in a hold position to close the service passage and trap fluid in the head end of the cylinder whereby the pressure of fluid then in the service passage is a measure of the load on the cylinder, said control valve being further characterized by means for blocking movement of the valve element to one of said selected positions thereof in the event of an excessive load on the cylinder, comprising:

(A) cooperating stop elements carried by the body and valve members, one of which is movable toward and from an operative position at which it is cooperable with the other element to prevent movement of the valve member to said one operating position thereof;

(B) means in one of said members defining a pressure chamber;

(C) a plunger in the chamber operatively associated with said movable stop element to hold the latter in its operative position in consequence of fluid pressure produced actuation of the plunger to an active position in the chamber.

(D) means on the valve member operable in said hold position thereof to communicate said chamber with the service passage so that load pressurized fluid in the latter can enter the chamber and exert force on the plunger tending to actuate the same to its active position;

(E) and means yieldingly opposing such actuation of the plunger with a predetermined force that exceeds the actuating force which fluid in the chamber pressurized by moderate loads on the cylinder imposes upon the plunger, but which opposing force is overcome by the actuating force which load pressurized fluid in the chamber exerts on the plunger whenever the load on the cylinder is excessive.

10. In a hydraulic control valve or the like having a control member movable in opposite directions to and from a defined position, means for locking said member at said defined position while an actuated element controlled by the valve is moving to a predetermined destination, and providing for release of said member from said position when the actuated element arrives at said destination, said means comprising:

(A) a pair of tubular members assembled in telescoping relation,
    (1) one of said tubular members being connected to the control member for motion in unison therewith, and the other of said tubular members being fixed,
    (2) the outer one of said tubular members having an inwardly opening groove;

(B) cam follower means carried by the inner tubular member and constrained to radial motion relative thereto, and outwardly projectable into engagement in said groove in the outer tubular member when the control member is in said defined position;

(C) a plunger-like member in the inner tubular member movable axially back and forth relative thereto, toward and from a locking position in which the plunger-like member is effective to hold the cam follower means in its projected position, said plunger-like member being biased away from its locking position;

(D) actuating means carried by one of the tubular members for moving the plunger-like member to its locking position, said actuating means being so connectable with an actuated element governed by the valve that movement of the actuated element toward a predetermined destination activates the actuating means to effect movement of the plunger-like member thereby to its locking position, and arrival of the actuated element at its destination deactivates the actuating means to permit biased return movement of the plunger-like member away from its locking position; and (E) cam means through which the plunger-like member transmits force from the actuating means to the cam follower means to hold the latter in said outward projected position thereof.

11. The control valve of claim 10, wherein said cam means comprises a part on the plunger-like member, movable back and forth therewith toward and from camming engagement with the cam follower means.

12. The control valve of claim 10, wherein said cam means is located axially to one side of the cam follower means, and further characterized by:

(A) a cam separate from said cam means, located axially to the other side of the cam follower means;

(B) and a spring acting upon said cam to press the same against the cam follower means whereby the force of said spring is exerted on the cam follower means through said cam to yieldingly bias the cam follower means radially outwardly and provide a detent when the plunger-like member is out of its locking position and the cam follower means registers with a groove in the outer tubular member.

13. The apparatus of claim 10, wherein said cam means comprises a cam member separate from the plunger-like member and movable axially between the latter and the cam follower means when the plunger-like member is out of its locking position; further characterized by means biasing said cam member in the first designated direction of axial motion independently of the biasing force upon the plunger-like member, so that when the plunger-like member is out of its locking position the cam member cooperates with the cam follower means to yieldingly bias the same radially outwardly and provide a detent when the cam follower means is brought into register with an inwardly opening groove in the outer tubular member.

14. In a hydraulic control valve or the like having a control member movable in opposite directions to and from a defined position, means for locking said control member against movement out of said defined position while an actuated element governed by the valve is moving to a predetermined destination, and providing for release of said control member from said position when the actuated element arrives at said destination, said means comprising:
  (A) a pair of tubular members assembled in telescoping relation,
    (1) one of said tubular members being connected to the control member for motion in unison therewith, and the other of said tubular members being fixed,
    (2) the outer one of said tubular members having an inwardly opening groove;
  (B) a locking element carried by the inner tubular member and constrained to radial in and out motion relative thereto, toward and from an outer projected position at which the locking element is engageable in said groove in the outer tubular member to hold the movable tubular member in a position corresponding to said defined position of the control member;
  (C) a retaining member movable axially in the inner tubular member between operative and inoperative positions and yieldingly biased toward said latter position;
  (D) an actuating device carried by one of the tubular members and adapted to be activated as a consequence of movement of an actuated element governed by the valve toward its destination to apply force to the retaining member in the direction to move the same to its operative position and to be deactivated as a consequence of said actuated element reaching its destination to permit biased return of the retaining member to its inoperative position;
  (E) and means rendered effective by the retaining member in the operative position thereof to act upon and hold said locking element against movement out of the groove in the outer tubular member.

15. In a hydraulic control valve or the like having a control member movable in opposite directions to and from a defined position, means for locking said control member against movement out of said defined position while an actuated element governed by the valve is moving to a predetermined destination, and providing for release of said control member from said position when the actuated element arrives at said destination, said means comprising:
  (A) a pair of tubular members assembled in telescoping relation,
    (1) one of said tubular members being connected to the control member for motion in unison therewith, and the other of said tubular members being fixed,
    (2) the outer one of said tubular members having an inwardly opening groove;
  (B) locking means carried by the inner tubular member and comprising a part which is constrained to radial in and out motion relative thereto, toward and from an outer projected position at which said part is engageable in said groove in the outer tubular member to hold the movable tubular member in a position corresponding to said defined position of the control member;
  (C) retaining means axially movable in the inner tubular member from an operative position engaging the locking means to confine said part thereof in its projected position, to an inoperative position at which the retaining means permits movement of said part of the locking means out of its projected position;
  (D) a spring acting on the retaining means to yieldingly bias the same toward its inoperative position;
  (E) and actuating means for applying force to the retaining means to move the same to its operative position under the control of said actuated element governed by the valve, said actuating means being adapted to be activated in consequence of movement of said actuated element toward its destination and to be deactivated when said actuated element reaches its destination to allow spring propelled return motion of the retaining means to its inoperative position.

16. In combination with a hydraulic control valve of the type including a body having therein a pair of valve spools each shiftable out of a defined neutral position to either of a pair of defined operating positions to selectively communicate one end of a fluid motor governed by the spool with either a pressure fluid supply passage in the body or with a fluid return passage in the body, means for locking a first one of said spools in its neutral position while a motor actuated element governed by the second spool is moving to a predetermined destination, and providing for release of said first spool for movement out of its neutral position when said actuated element reaches its destination, comprising:
  (A) a part fixed with respect to the body;
  (B) a part fixed with respect to said first spool to move therewith;
  (C) locking means carried by one of said parts and including an element movable relative to said first spool toward and from engagement with the other of said parts to hold said first spool in its neutral position;
  (D) a retaining member movable relative to the body from an operative position engaging the locking means and locking said element thereof engaged with said other part, to an inoperative position permitting disengagement of the locking element from said other part;
  (E) a spring acting on the retaining member to yieldingly bias the same toward its inoperative position;
  (F) and actuating means for the retaining member, adapted to be activated in consequence of movement of said motor actuated element governed by said second spool toward its destination, to move the retaining member to its operative position at which it effects locking of said first spool against movement out of its neutral position, and adapted to be deactivated as a consequence of said motor actuated element reaching its destination to permit spring propelled return movement of the retaining member to its inoperative position.

17. The combination of claim 16, wherein said actuating means comprises a fluid pressure responsive plunger connected to the retaining member, and further characterized by:
  (A) a cylinder on the body in which said plunger operates;
  (B) and means communicating said cylinder with the return passage in the body so that the pressure of motor exhaust fluid in the return passage activates said actuating means and effects locking of the first spool in its neutral position, and whereby the actuating means is deactivated in consequence of the drop in pressure in the return passage that occurs when the motor actuated element reaches its destination.

References Cited by the Examiner
UNITED STATES PATENTS

| | | | |
|---|---|---|---|
| 2,607,197 | 8/1952 | Johnson | 91—189 |
| 2,848,014 | 8/1958 | Tennis | 137—624.27 |
| 2,874,720 | 2/1959 | Vahs | 137—624.27 |
| 3,088,489 | 5/1963 | Stacey | 91—388 |
| 3,132,668 | 5/1964 | Stacey | 137—624.27 |

SAMUEL LEVINE, *Primary Examiner.*